United States Patent
Bae et al.

(10) Patent No.: US 9,013,624 B2
(45) Date of Patent: Apr. 21, 2015

(54) IMAGE PICKUP APPARATUS HAVING SAME EXPOSURE TIME AMONG PIXEL GROUPS AND ASSOCIATED METHOD AND COMPUTER-READABLE MEDIUM

(71) Applicant: Samsung Electronics Co., Ltd., Suwon-si, Gyeonggi-do (KR)

(72) Inventors: Jum-han Bae, Seongnam-si (KR); Kyu-yul Choi, Yongin-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 40 days.

(21) Appl. No.: 13/714,660

(22) Filed: Dec. 14, 2012

(65) Prior Publication Data

US 2013/0155300 A1  Jun. 20, 2013

(30) Foreign Application Priority Data

Dec. 16, 2011 (KR) ........................ 10-2011-0136681

(51) Int. Cl.
*G03B 7/00* (2014.01)
*H04N 5/235* (2006.01)
*H04N 5/353* (2011.01)

(52) U.S. Cl.
CPC ............ *H04N 5/2353* (2013.01); *H04N 5/353* (2013.01)

(58) Field of Classification Search
USPC ........................................ 348/302, 362, 222.1
See application file for complete search history.

(56) References Cited

U.S. PATENT DOCUMENTS

| | | | |
|---|---|---|---|
| 2004/0201714 A1* | 10/2004 | Chung | 348/220.1 |
| 2005/0168623 A1* | 8/2005 | Stavely et al. | 348/362 |
| 2008/0024655 A1* | 1/2008 | Maeda | 348/371 |
| 2010/0253833 A1* | 10/2010 | Deever et al. | 348/362 |
| 2011/0181754 A1* | 7/2011 | Iwasaki | 348/230.1 |
| 2013/0113967 A1* | 5/2013 | Wang | 348/302 |

* cited by examiner

*Primary Examiner* — Gevell Selby
(74) *Attorney, Agent, or Firm* — Staas & Halsey LLP (57) ABSTRACT

An image pickup apparatus includes an image pickup element to obtain an image of a subject using a plurality of pixels which are classified into a plurality of pixel groups and are arranged in a matrix pattern, a controller to apply a reset signal to start exposure of a pixel on a pixel group basis in sequence, to read out pixel values of the plurality of pixel groups on the pixel group basis in sequence according to the reset signal applying order, and to control the image pickup element such that each of the pixel groups has a same exposure time, and a storage unit to store the pixel values read out on the pixel group basis in sequence.

21 Claims, 8 Drawing Sheets

IMAGE PICKUP APPARATUS HAVING SAME EXPOSURE TIME AMONG PIXEL GROUPS AND ASSOCIATED METHOD AND COMPUTER-READABLE MEDIUM

CROSS-REFERENCE TO RELATED APPLICATIONS

This application claims priority under 35 U.S.C. §119 from Korean Patent Application No. 10-2011-0136681, filed on Dec. 16, 2011 in the Korean Intellectual Property Office, the disclosure of which is incorporated herein by reference in its entirety.

BACKGROUND OF THE INVENTION

1. Field of the Invention

Methods and apparatuses consistent with exemplary embodiments relate to an image pickup apparatus, an image pickup method, and a computer-readable medium, and more particularly, to an image pickup apparatus, an image pickup method, and a computer-readable recording medium, which are capable of picking up an image at a high speed.

2. Description of the Related Art

A camera shutter is generally divided into a lens shutter and a focal plane shutter. The lens shutter is placed in the proximity of a lens, whereas the focal plane shutter is placed in the proximity of a focal plane.

The focal plane shutter includes two types of shutters, that is, a horizontal shutter and a vertical shutter, according to a movement direction of a front curtain and a rear curtain. In recent years, the vertical shutter is preferred since it is more beneficial to performance.

In an image pickup apparatus employing such a focal plane shutter, two curtains including a front curtain and a rear curtain travel so that exposure is performed with respect to a subject, and light corresponding to the subject is incident on an image pickup surface through a lens. That is, the front curtain travels so that the image pickup surface of the image pickup apparatus is opened and thus exposure starts, and the rear curtain travels with a time difference because of a predetermined shutter speed, so that the exposure finishes.

However, such a mechanical shutter requires an ultra-precision machine that controls a very short exposure time such as 1/4000 second and 1/800 second, and is very expensive since it is designed to have to operate hundreds of thousands times. Also, the mechanical shutter has problems such as a curtain shock which is caused by vibration occurring when the curtain travels, or a release time lag which is a time interval required to charge the curtain.

In order to solve the above problems of the mechanical shutter, a technique for processing a front curtain electronically may be usable. However, even in the technique for processing only the front curtain electronically, there is still a problem that mechanical vibration of a rear curtain affects image quality during a high-speed image pickup process.

SUMMARY OF THE INVENTION

One or more exemplary embodiments provide an image pickup apparatus, an image pickup method, and a computer-readable medium, which are capable of picking up an image at a high speed.

Additional features and utilities of the present general inventive concept will be set forth in part in the description which follows and, in part, will be obvious from the description, or may be learned by practice of the general inventive concept The foregoing and/or other features and utilities of the present general inventive concept may be achieved by providing an image pickup apparatus including an image pickup element to obtain an image of a subject using a plurality of pixels which are classified into a plurality of pixel groups and are arranged in a matrix pattern, a controller to apply a reset signal to start exposure of a pixel on a pixel group basis in sequence, to read out pixel values of the plurality of pixel groups on the pixel group basis in sequence according to the reset signal applying order, and to control the image pickup element such that each of the pixel groups has a same exposure time, and a storage unit to store the pixel values read out on the pixel group basis in sequence.

The image pickup apparatus may further include a compression unit to compress the read-out pixel values on the pixel group basis, and the storage unit may store the pixel values which are compressed on the pixel group basis.

The compression unit may compress the read-out pixel values using a near-lossless compression algorithm.

Each of the pixel groups may include different color groups, and the compression unit may compress the read-out pixel values on a color group basis in each of the pixel groups.

The image pickup apparatus may further include an image processing unit which restores the compressed pixel values which are stored in the storage unit and generates a single image.

The controller may control the image pickup element to perform only a storing operation, while the storage unit stores the read-out pixel values.

Each of the pixel groups may be a row of the matrix.

Each of the pixel groups may be a plurality of lines of the matrix.

At a predetermined time after the reset signal is applied, the controller may control the image pickup element to read out pixel values of pixels in the pixel group to which the reset signal is applied.

The image pickup apparatus may further include an image processing unit which corrects each of the plurality of pixel values in the pixel group.

The foregoing and/or other features and utilities of the present general inventive concept may also be achieved by providing an image pickup method of an image pickup apparatus, the image pickup method including: applying a reset signal for starting exposure of a pixel to an image pickup element, which includes a plurality of pixels which are classified into a plurality of pixel groups and are arranged in a matrix pattern, on a pixel group basis in sequence, reading out pixels values of the plurality of pixel groups on the pixel group basis in sequence so that each of the pixel groups has a same exposure time, and storing the pixel values which are read out on the pixel group basis in sequence.

The image pickup method may further include compressing the read-out pixel values in the pixel group basis, and the storing may include storing the pixel values which are compressed on the pixel group basis.

The compressing may include compressing the read-out pixel values using a near-lossless compression algorithm.

Each of the pixel groups may include different color groups, and the compressing may include compressing the read-out pixel values on a color group basis in each of the pixel groups.

The image pickup method may further include restoring the compressed pixel values which are stored in the storage unit and generating a single image.

The storing may include performing only an operation of storing only the read-out pixel values when the read-out pixel values are stored.

Each of the pixel groups may be a row of the matrix.

Each of the pixel groups may be a plurality of rows of the matrix.

The reading out may include reading out pixel values of pixels in the pixel group to which the reset signal is applied at a predetermined time after the reset signal is applied.

The image pickup method may further include correcting each of the plurality of pixel values in the pixel group.

The foregoing and/or other features and utilities of the present general inventive concept may also be achieved by providing a computer-readable medium including a program to execute an image pickup method, the image pickup method including applying a reset signal to start exposure of a pixel to an image pickup element, which includes a plurality of pixels which are classified into a plurality of pixel groups and are arranged in a matrix pattern, on a pixel group basis in sequence, reading out pixels values of the plurality of pixel groups on the pixel group basis in sequence so that each of the pixel groups has a same exposure time, and storing the pixel values which are read out on the pixel group basis in sequence.

The foregoing and/or other features and utilities of the present general inventive concept may also be achieved by providing an image pickup apparatus including an image pickup element having a plurality of pixel groups each having one or more pixels to obtain an image of a subject, and a controller to generate a reset signal to be sequentially applied to the respective pixel groups such that the pixel groups are sequentially activated and pixel values of the pixels of the respective pixel groups are sequentially generated from the image pickup element to form the image of the subject.

The image pickup apparatus may further include a storage unit to sequentially store the sequentially generated pixel values.

The reset signal may be applied to each pixel group to maintain an activation operation on the corresponding pixels to generate the pixel values a predetermined time after the reset signal is applied to each pixel group.

The controller may terminate application of the reset signal to each pixel group a predetermined time after the reset signal is applied.

The reset signal may be sequentially applied to each pixel group for a reset period, and the reset periods of the adjacent pixel groups overlap each other during an overlapping time until the reset period of one of the adjacent pixel group is expired.

The pixel groups may have different exposure times with respect to locations of the pixel groups according to the sequentially applied reset signal, and the controller may perform a correction operation on the generated pixel values to compensate for the different exposure times of the respective pixel groups.

The controller may generate a control signal to be sequentially applied to each of the pixel groups to read out the pixel values from the pixels of the respective pixel groups when the reset signal is applied to the pixel groups.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

Figure 1:
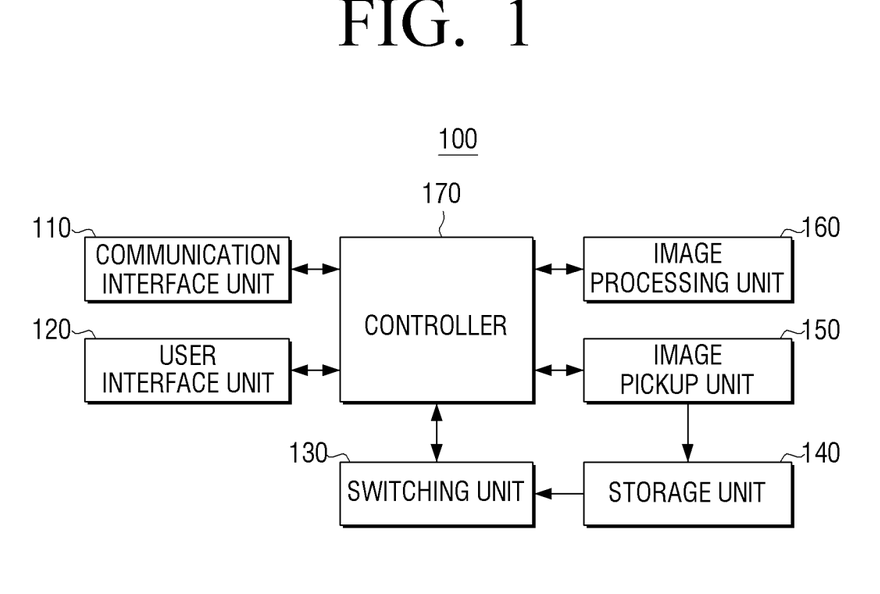
FIG. 1 is a block diagram illustrating an image pickup apparatus according to an exemplary embodiment of the present general inventive concept.

FIG. 1 is a block diagram illustrating an image pickup apparatus 100 according to an exemplary embodiment of the present general inventive concept.

Referring to FIG. 1, the image pickup apparatus 100 according to an exemplary embodiment includes a communication interface unit 110, a user interface unit 120, a switching unit 130, a storage unit 140, an image pickup unit 150, an image processing unit 160, and a controller 170. The image pickup apparatus 100 according to the present exemplary embodiment may be a digital camera, a camcorder, a mobile phone, a tablet computer apparatus, a portable multimedia player (PMP), a web cam, or a black box, which can pick up an image.

The communication interface unit 110 is provided to connect the image pickup apparatus 100 to at least one terminal apparatus (not illustrated), and may access the terminal apparatus in a wireless or wired manner through a local area network (LAN) and the Internet, and also may access the terminal apparatus through a universal serial bus (USB) port or a Bluetooth module.

The communication interface unit 110 transmits contents stored by the image pickup apparatus 100 to an external terminal apparatus (not illustrated). The communication interface unit 110 may transmit an image file stored in the storage unit 140, which will be described below, to an external terminal apparatus (not illustrated) or server. The contents recited herein may be image contents or moving image contents that can be generated by the image pickup apparatus 100.

The user interface unit 120 may include a plurality of function keys through which a user sets or selects various functions supported by the image pickup apparatus 100, and may display a variety of information provided by the image pickup apparatus 100. The user interface unit 120 may be realized by a device that implements input and output simultaneously such as a touch pad, or may be realized by combining an input device such as a plurality of buttons and a display device such as a liquid crystal display (LCD) and an organic light emitting diode (OLED).

The user interface unit 120 receives various control commands such as an image pickup command (or a shutter command). The user interface unit 120 receives settings regarding an image pickup operation thereof. The user interface unit 120 may receive settings regarding which file format is used to store a picked-up image, a resolution of a picked-up image, digital zoom, auto white balance (AWB), auto focus (AF), auto exposure (AE), and so on.

The user interface unit 120 may display a picked-up image. The user interface unit 120 may display a picked-up image according to an image pickup command of the user.

The user interface unit 120 may display various contents stored in the storage unit 140 according to a reproducing command of the user. The contents recited herein may be image contents or moving image contents. For example, if the image pickup apparatus 100 is capable of photographing a moving image, the user interface unit 120 may reproduce a moving image content which is pre-stored in the storage unit 140.

The switching unit 130 controls data provided to the storage unit 140. The switching unit 130 is disposed between the controller 170 and the storage unit 140 and selectively connects the storage unit 140 to the controller 170 or to the image pickup unit 150. For instance, when the image pickup apparatus 100 performs an image pickup operation, the switching unit 130 may temporarily block a connection between the storage unit 140 and other elements of the image pickup apparatus 100 so that the storage unit 140 receives and stores only data transmitted from the image pickup unit 150.

The storage unit 140 stores pixels values that are read out on a pixel group basis in sequence. The storage unit 140 may store data (pixel values of a pixel group) transmitted from the image pickup unit 150, which will be described below. The data transmitted may be compressed data.

The storage unit 140 stores data corresponding to a generated image. The storage unit 140 may store an image generated or corrected by the image processing unit 160, which will be described below.

The storage unit 140 may be realized by an internal storage medium or an external storage medium of the image pickup apparatus 100, such as a USB memory, a removable disk including a flash memory, a storage medium connected to the image pickup apparatus, and a web server over a network, and includes a volatile memory for high speed storage (for example, a double data rate (DDR) memory). The pixel values transmitted from the image pickup unit 150 may be temporarily stored in a volatile memory to be processed at a high speed. The storage unit 140 may have a non-volatile memory to store the processed image.

The image pickup unit 150 includes an image pickup element which obtains an image of a subject using a plurality of pixel groups, which are arranged in a matrix pattern. The image pickup element may not have a mechanical shutter to obtain an image of a subject such that the image pickup element obtains an image of a subject using a plurality of pixel groups, which are arranged in a matrix pattern, without a mechanical shutter. The image pickup unit 150 may include a lens to collect light from a subject and focuses an optical image on an image pickup area, an image pickup element to perform photoelectric transformation to convert light incident through the lens into an electric signal, and an analogue-digital (AD) converter to convert a signal of an analogue format of the image pickup element into a digital signal and outputs the digital signal. The image pickup element may be a charge coupled device (CCD) image pickup element or a complementary metal oxide semiconductor (CMOS) image pickup element. Detailed constitution and operation of the image pickup unit 150 will be explained below with reference to FIGS. 2 and 3.

The image processing unit 160 generates an image. The image processing unit 160 combines the pixel values stored in the storage unit 140 on the pixel group basis, thereby generating a single image. If the pixel values stored in the storage unit 140 are compressed data, the image processing unit 160 may restore (decompress) the compressed data into pixel values and may generate a single image using the restored pixel values.

The image processing unit 160 may correct a generated image. Although each of the pixel groups has the same exposure time, the plurality of pixels in the same pixel group may have different exposure times according to a reading-out order. Accordingly, the image processing unit 160 may correct an amount of light for each of the pixel values of the plurality of pixels in the pixel group according to the reading-out order. The operation of correcting the amount of light will be explained below in detail with reference to FIG. 9.

In the present exemplary embodiment, the amount of light is corrected after the image is generated. That is, an image is generated by combining pixel values of a pixel group and then an amount of light for the generated image is corrected. However, it is possible that after an amount of light for each of a plurality of pixel values in a pixel group is corrected, an image may be generated by combining pixel groups.

The image processing unit 160 may perform signal processing such as digital zoom, auto white balance (AWB), auto focus (AF), and auto exposure (AE) with respect to the generated image in order to convert a format and adjust an image scale. Although an operation of receiving a voice signal has not been described in the present exemplary embodiment, the image processing unit 160 may generate a moving image file by combining an audio signal (or a voice signal) obtained through an internal microphone or an external microphone and a plurality of picked-up images, and may store the generated moving image file in the storage unit 140.

The controller 170 may control the elements of the image pickup apparatus 100. When an image pickup command is input, the controller 170 controls to apply a reset signal to start exposure of a pixel on a pixel group basis of the image pickup element in sequence, and controls the image pickup unit 160 to read out data from the pixel group to which the reset signal is applied at a predetermined time.

The controller 170 may control the switching unit 130 such that the storage unit 140 stores only the data transmitted from the image pickup unit 150 during the image pickup operation.

If the image pickup operation of the image pickup unit 150 is completed, the controller 170 may control the image processing unit 160 to generate an image using the pixel values stored in the storage unit 140 on the pixel group basis.

As described above, the image pickup apparatus 100 according to the present exemplary embodiment applies the reset signal on the pixel group basis in sequence, as an operation corresponding to an operation of a related-art mechanical front curtain, and reads out the pixel values on the pixel group basis at a predetermined time after the reset signal is applied, as an operation corresponding to an operation of a mechanical rear curtain. Therefore, the image pickup apparatus 100 can perform the image pickup operation without a mechanical shutter.

Also, since the image pickup apparatus 100 according to the present exemplary embodiment compresses the pixel values of the picked-up pixels prior to transmitting and processing them, it is possible to process the data picked up by the image pickup unit 140 at a high speed and also it is possible to reduce heat and power consumption when transmitting the data, and to reduce a chip area of a system.

Although the image processing unit 160 and the controller 170 are separate elements in FIG. 1, the image processing unit 160 and the function of the controller 170 may be integrated into a single element (for example, a system on chip (SOC)) to perform functions thereof. This will be explained below with reference to FIG. 2.

Figure 2:
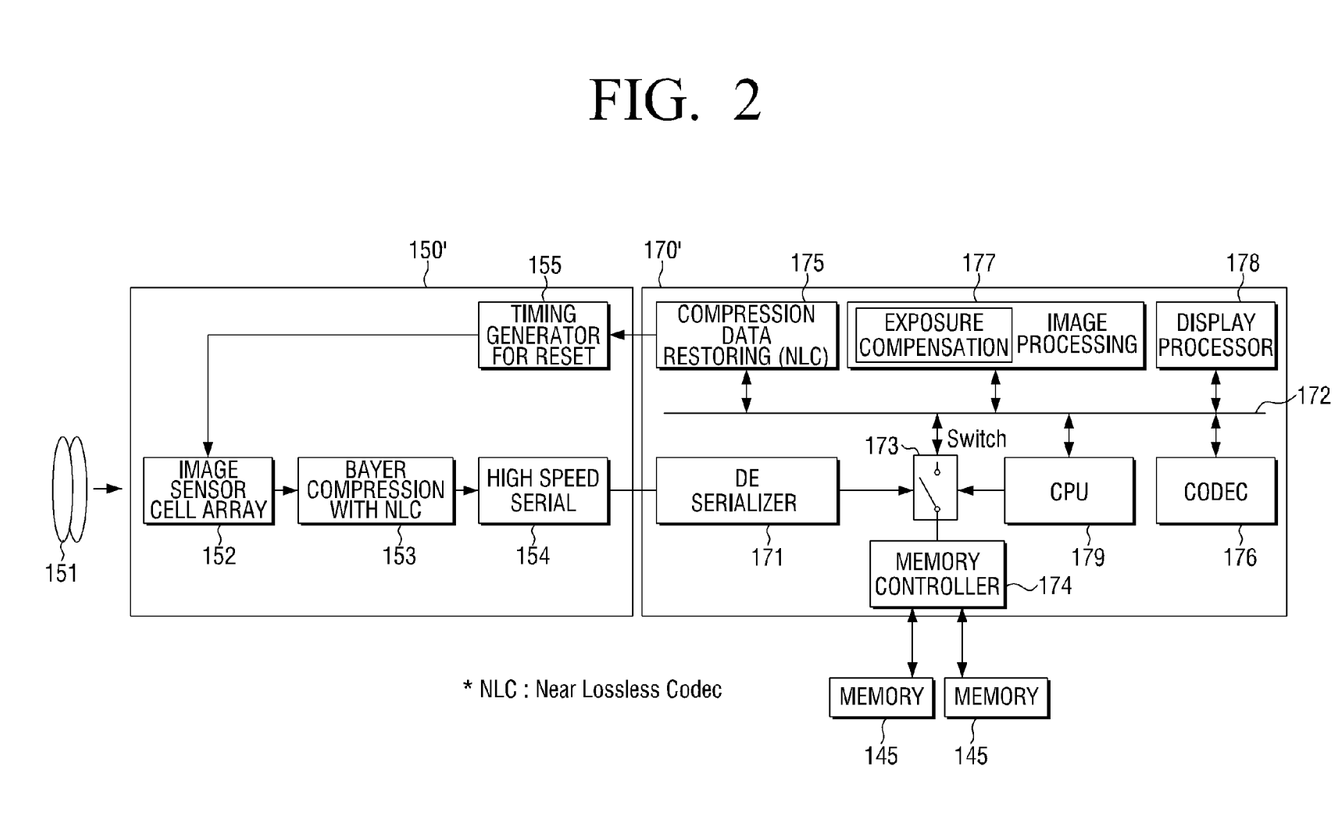
FIG. 2 is a view illustrating an image pickup unit and a controller of an image pickup apparatus according to an exemplary embodiment of the present general inventive concept.

FIG. 2 is a view illustrating an image pickup unit 150' and a controller 170' of an image pickup apparatus 100. The image pickup unit 150' and the controller 170' of FIG. 2 may correspond to the image pickup unit 150 and the controller 170 of the image forming pickup apparatus 100 of FIG. 1.

Referring to FIGS. 1 and 2, the image pickup unit 150' may include a lens unit 151, an image pickup element 152, a compression unit 153, a high speed serial 154, and a timing generation unit 153.

The lens unit 151 collects light from a subject and focuses an optical image on an image pickup area of the image pickup element 152. The image pickup element 152 includes an image sensor array to form the image pickup area.

The image pickup element 152 performs photoelectric transformation to convert light incident through the lens unit 151 into an electric signal using a plurality of pixels which are classified into a plurality of pixel groups and are arranged in a matrix pattern. The image pickup element 152 may convert a signal of an analogue format into a digital signal in the photoelectric transformation. The image pickup element 152 may be a CCD image pickup element or a CMOS image pickup element. Detailed constitution and operation of the image pickup element 152 will be explained below.

The compression unit 153 compresses pixel values that are read out on a pixel group basis. The compression unit 152 may compress a plurality of pixel values that are read out on the pixel group basis using a near-lossless compression algorithm. The near-lossless compression algorithm is a method that compresses image data, bearing a slight loss. In the present exemplary embodiment, the compression unit 153 may compress the read-out pixel values in a compression ratio of ½ using a near-lossless compression (NLC) algorithm. For example, the compression unit 153 may perform BAYER compression algorithm with NLC.

The high speed serial 154 may transmit the pixel values which are compressed on the pixel group basis to the controller 170'. The high speed serial 154 may transmit the pixel values which are compressed by the compression unit 153 to the controller 170' using the MIPI M-PHY standard defined by the MIPI Alliance Specification for M-PHY. The MIPI M-PHY standard is a high speed digital serial interface and is illustrated in table 1 below:

TABLE 1

| MIPI M-PHY | |
|---|---|
| Architecture | Difference Signaling Interface |
| Max Lane | There is no limit to Link dependent, Phy |
| Clock Type | Embedded Clock, Receiver CDR are required |
| Speed (HS-Mode) | HS-G1: 1.248 Gbps(a-series), 1.457 Gbps(b-series) |
| | HS-G2: 2.496 Gbps(a-series), 2.915 Gbps(b-series) |
| | HS-G3$^{*1}$: 4.992 Gbps(a-series), 5.830 Gbps(b-series) |
| Size (1Tx + 1Rx + PLL) | ARASAN: |
| | G1: 0.42 mm2 @TSMC 40LP |
| | G2: 0.5 mm2 @TSMC 40LP |
| Power | TSMC40 G1: 52.8 mW @TSMC 40LP |
| | G2: 81.4 mW @TSMC 40LP |
| Power (mW/Gbps) | G1: 24.15 mW/Gbps |
| | G2: 18.62 mW/Gbps |

The image pickup element 152 according to the present exemplary embodiment may be an image element of 24M pixel, and may perform a high speed image pickup operation to process 120 sheets per second as described above. In order to process an image generated by the high speed image pickup operation, the high speed serial 154 requires a throughput of 6 G pixel per second. One pixel may have a size of 12 bit, 14 bit, or 16 bit, and as a result, a throughput of 12 G byte per second is required.

However, since the pixel values are compressed in the compression ratio of ½ in the present exemplary embodiment, the high speed serial 154 requires a throughput of 6 G byte per second. If the MIPI M-PHY G3 1Lane is about 5 G bps and the area is 0.6 mm, about 10 lanes are required in order to output 6 G bps per second. Accordingly, the high speed serial 154 has a size of 6 mm$^2$.

The timing generation unit 155 controls the image pickup operation of the image pickup element 152. The timing generation unit 155 generates a reset signal to start exposure of a pixel and a control signal to control a reading-out time of an electric signal on which photoelectric transformation is performed, and may provide the reset signal and the control signal to the image pickup element 152. A timing of the reset signal and the control signal generated by the timing generation unit 155 will be explained below with reference to FIG. 3.

The controller 170' receives the pixel values which are obtained in the pixel group basis or the compressed pixel values (hereinafter, referred to as data) from the image pickup unit 140, and may store the received data in a volatile memory 145. The controller 170' combines the data stored on the pixel group basis, thereby generating a single image. The controller 170' may correct an amount of light for the generated image. The controller 170' may include a serial-parallel converter 171, a bus 172, a switch 173, a memory controller 174, a restoring unit 175, a codec 176, an image processing unit 177, a display processor 178, and a central processing unit (CPU) 179.

The serial-parallel converter 171 converts the data received from the image pickup unit 150 into parallel data. The serial-parallel converter 171 converts serial data transmitted through the high speed serial 154 of the image pickup unit 150 into parallel data, and transmits the converted parallel data to the memory controller 174 so that the converted parallel data can be stored in a volatile memory. The serial-parallel converter 171 may be referred to as serializer/deserializer or deserializer.

The bus 172 transmits signals to the elements (or units) in the controller 170'.

The switch 173 selectively changes a connection state of the memory controller 174. The switch 173 is disposed between the bus 172 and the memory controller 174 and selectively connects the memory controller 174 and the bus 172 or disconnects the memory controller 174 and the bus 172 from each other.

The memory controller 174 controls an operation of a volatile memory (for example, a DDR memory). The memory controller 174 may control a reading or writing operation of at least one volatile memory 145 according to a request of another element in the controller 170'. However, when an image pickup operation is performed, that is, when data of high speed and high capacity is stored by the image pickup unit 150, the memory controller 174 may control the volatile memory 145 to use a resource of the volatile memory 145 to perform the writing operation. The volatile memory 145 may be included in the storage unit 140 of FIG. 1. It is possible that data temporarily stored in the volatile memory 145 in the writing operation may be stored a non-volatile memory of the storage unit 140.

The restoring unit 175 restores the compressed data which is temporarily stored in the volatile memory 145. The restoring unit 175 may restore the compressed data for each pixel group using a restoring algorithm corresponding to the compression algorithm which is applied to the compressed data.

When the image pickup apparatus 100 photographs a moving image, the codec 176 encodes a plurality of images picked up by the image pickup unit 150 to generate a moving image file. Although an operation of receiving a voice signal has not been described in the present exemplary embodiment, the codec 176 may combine a voice signal obtained through an internal microphone or an external microphone and a plurality of picked-up images, thereby generating a moving image file.

The image processing unit 177 generates a restored image. When the pixel values stored in the memory 145 is compressed data, the image processing unit 177 controls the restoring unit 175 to change the compressed data to the pixel values and combines the restored pixel values for each pixel group, thereby generating a single image.

The image processing unit 177 may perform exposure compensation to correct an amount of light for each of the plurality of pixel values in the pixel group. The operation of correcting the amount of light will be explained below with reference to FIG. 9.

The image processing unit 177 may perform signal processing such as digital zoom, auto white balance (AWB), auto focus (AF), and auto exposure (AE) with respect to the image to convert a format and adjust an image scale.

The display processor 178 may generate a user interface widow to be displayed on the user interface unit 120 or may control an operation of the user interface unit 120.

The CPU 179 controls the elements of the controller 170'. When an image pickup command is input by the user, the CPU 179 may control the timing generation unit 155 to apply a reset signal to start exposure of a pixel at a different time according to a pixel group of the image pickup element. The CPU 179 may control the timing generation unit 155 to provide a control signal for reading out the pixel values of the pixel group to which the reset signal is applied to the image pickup element 152.

Although the restoring unit 175 and the image processing unit 177 are separate elements in FIG. 2, the restoring unit 175 and the function of the image processing unit 177 may be incorporated into a single element to perform functions thereof.

Figure 3:
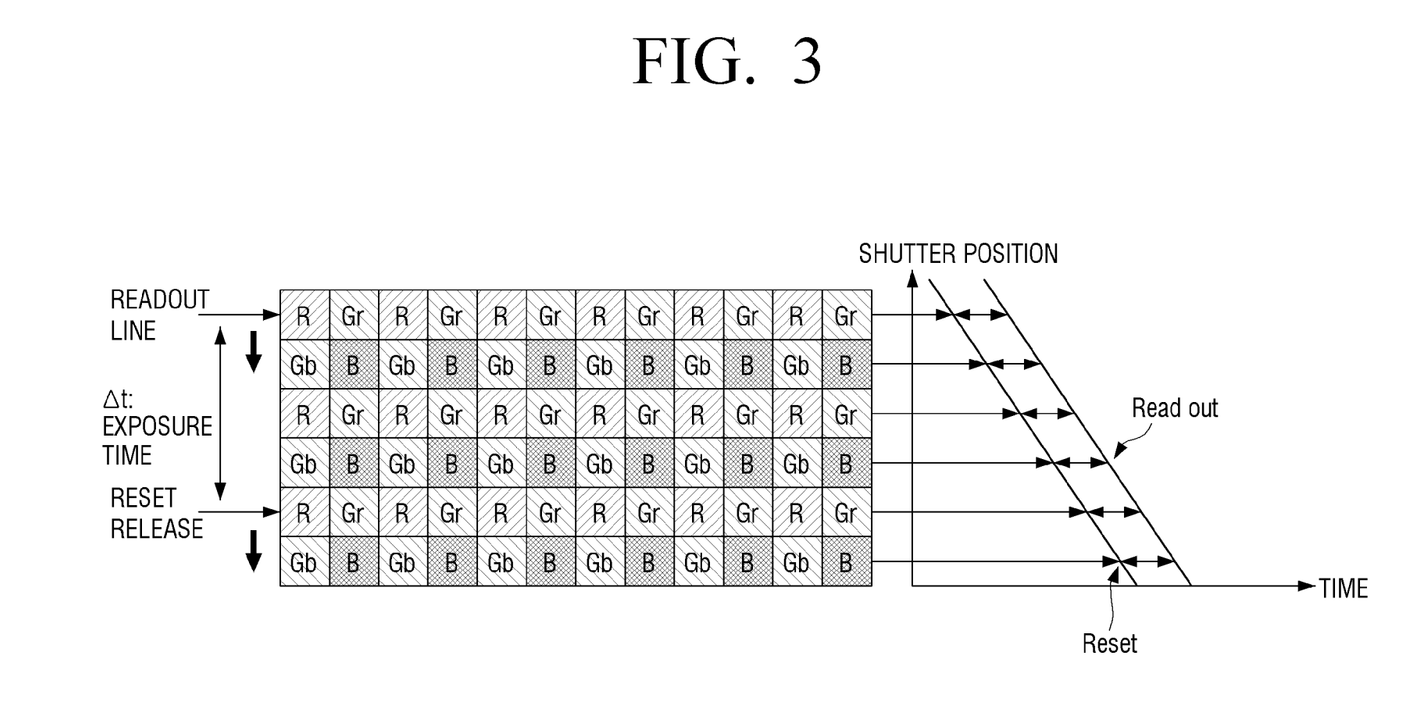
FIG. 3 is a view illustrating an operation of an image pickup element of an image forming element of an image pickup apparatus according to an exemplary embodiment of the present general inventive concept.

FIG. 3 is a view illustrating an operation of the image pickup element 152 of the image pickup unit 150' of FIG. 2 according to an exemplary embodiment of the present general inventive concept.

Referring to FIG. 3, a plurality of pixels are arranged in a matrix pattern. The plurality of pixels are classified into a plurality of pixel groups. There are various methods of classifying the plurality of pixels into the plurality of pixel groups, which will be described below with reference to FIGS. 4 to 6.

In the exemplary embodiment of FIG. 3, sensors to read out different color values (for example, an R sensor to sense red, a Gr sensor to sense a corresponding green, a Gb sensor to sense a corresponding green, a B sensor to sense blue) are alternately arranged in one position of the matrix pattern. However, It is possible that a sensor to sense all of the RGB colors may be arranged in one position of the matrix pattern. That is, four color sensors (that is, the R sensor, the Gr sensor, the Gb sensor, and the B sensor) of FIG. 3 may be arranged in one position of the matrix.

Hereinafter, the image pickup operation of the image pickup element 152 according to an exemplary embodiment will be explained.

Referring to the right side drawing of FIG. 3, an order of applying a reset signal and an order of applying a control signal to read out are illustrated. That is, in the image pickup operation of the image pickup element 152 according to the present exemplary embodiment, the reset signal is applied on the pixel group basis in sequence. The control signal for reading out is applied on the pixel group basis in sequence at a predetermined time after the reset signal is applied (that is, after an exposure time). Accordingly, each of the pixel groups has the same exposure time.

Figure 4:
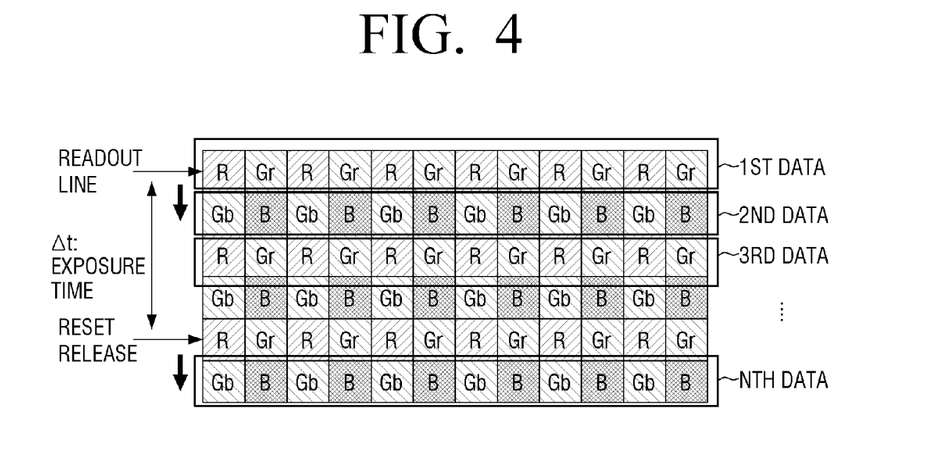
FIG. 4 is a view illustrating an image pickup group according to an exemplary embodiment of the present general inventive concept.

FIG. 4 is a view illustrating an image pickup group according to an exemplary embodiment of the present general inventive concept.

The image pickup group according to this exemplary embodiment is divided by a matrix row. Referring to FIG. 4, a first matrix row is a first pixel group, a second matrix row is a second pixel group, and a last matrix row is an n-th pixel group.

Accordingly, when an image pickup command is input by the user, a reset signal is applied to the first pixel group (that is, the first matrix row).

After a predetermined time after the reset signal is applied to the first pixel group (that is, the first matrix row), a reset signal is applied to the second pixel group (that is, the second matrix row). In this order, a reset signal is applied to the n-th pixel group (that is, the last matrix row).

At a predetermined time after the reset signal is applied to the first pixel group, a reading-out operation is performed with respect to the first pixel group. The predetermined time may be referred to as an exposure time to correspond to a period of time between operations of a rear curtain and a front curtain of a related-art mechanical shutter. The reading-out operation is performed separately from the applying operation of the reset signal. That is, the reading-out operation is not an operation that is performed after the reset signal is applied to all of the pixel groups, but an operation that is performed right after a predetermined time elapses after one pixel group is exposed, the reading-out operation is performed. Therefore, the exposure time of each of the pixel groups is the same.

Repeatedly, a reading-out operation is performed for a next pixel group at a predetermined time after a reset signal for the next pixel group is applied.

Figure 5:
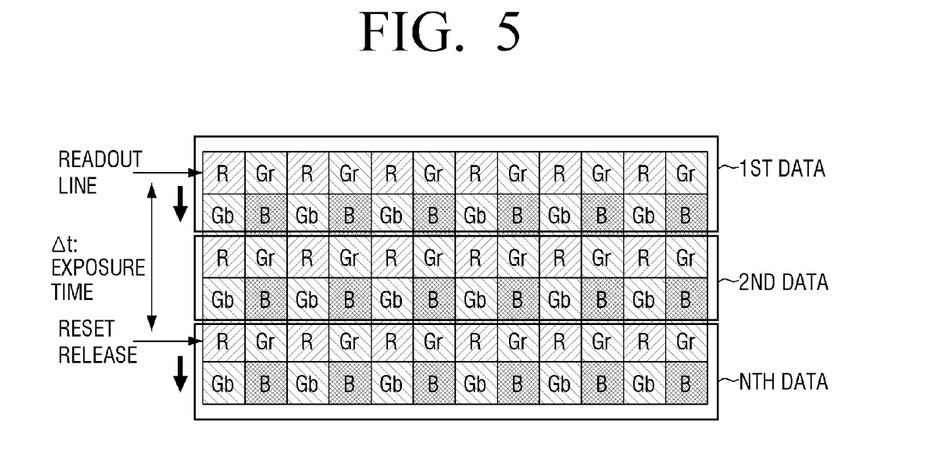
FIG. 5 is a view illustrating an image pickup group according to an exemplary embodiment of the present general inventive concept.

FIG. 5 is a view illustrating an image pickup group according to an exemplary embodiment of the present general inventive concept.

The image pickup group according to this exemplary embodiment is divided by a number of rows, for example, two rows of the matrix.

Referring to FIG. 5, a first matrix row and a second matrix row are a first pixel group and a third matrix row and a fourth matrix row are a second pixel group. A matrix row before the last and the last row are a n-th pixel group.

Accordingly, when an image pickup command is input by the user, a reset signal is applied to the first pixel group (that is, the first and the second matrix rows).

After a predetermined time after the reset signal is applied to the first pixel group (that is, the first and the second matrix rows), a reset signal is applied to the second pixel group (that is, the third and the fourth matrix rows). In this order, a reset signal is applied to the n-th pixel group (that is, the matrix row before the last and the last matrix row).

At a predetermined time after the reset signal is applied to the first pixel group, a reading-out operation is performed with respect to the first pixel group. Repeatedly, at a predetermined time after a reset signal is applied to a next pixel group, a reading-out operation is performed with respect to the next pixel group.

Although the two matrix rows are grouped into one pixel group in the present exemplary embodiment, three or more matrix rows may be grouped into one pixel group in practice.

Figure 6:
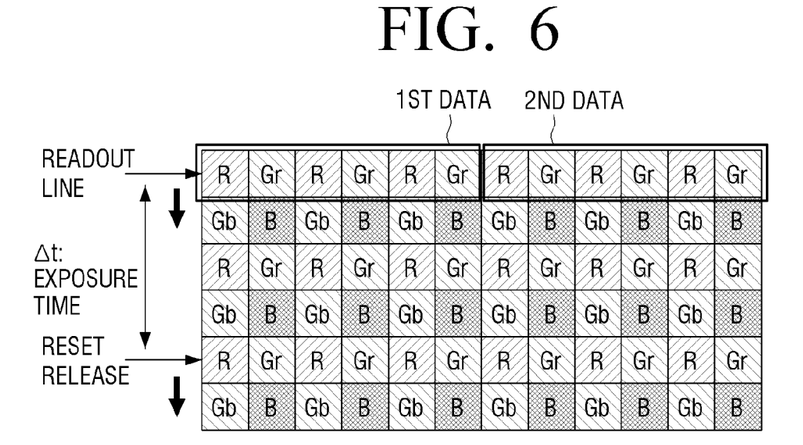
FIG. 6 is a view illustrating an image pickup group according to an exemplary embodiment of the present general inventive concept.

FIG. 6 is a view illustrating an image pickup group according to an exemplary embodiment of the present general inventive concept.

The image pickup group according to this exemplary embodiment is divided into pixel groups by a matrix row and left and right regions of the matrix row.

Referring to FIG. 6, a left region of a first matrix row is a first pixel group and a right region of the first matrix row is a second pixel group. The right region of the last matrix row is an n-th pixel group.

Accordingly, when an image pickup command is input by the user, a reset signal is applied to the first pixel group (that is, the left region of the first matrix row).

After a predetermined time after the reset signal is applied to the first pixel group (that is, the left region of the first matrix row), a reset signal is applied to the second pixel group (that is, the right region of the first matrix row). In this order, a reset signal is applied to the n-th pixel group (that is, the right region of the last matrix row).

At a predetermined time after the reset signal is applied to the first pixel group, a reading-out operation is performed with respect to the first pixel group.

Repeatedly, at a predetermined time after a reset signal is applied to a next pixel group, a reading-out operation is performed with respect to the next pixel group.

Although the pixel groups are formed by dividing one matrix row into two regions in FIG. 6, the pixel groups may be divided by dividing one matrix row into three or more regions, or may be divided by dividing two or more rows into two or more regions.

It is also possible that each row can be divided into a plurality of sub-row groups. In this case, the pixel array can be divided into the pixel groups according to a number of rows and one or more of the plurality of sub-row groups of the rows. For example, the plurality of sub-row groups may be formed by dividing pixels of each row into first to sixth sub-row groups. Accordingly, first and second sub-row groups of first three rows are a first pixel group, second and third sub-row groups of the first three rows are a second pixel group, fifth and sixth sub-row groups of the first three rows are a third group. And, first and second sub-row groups of second three rows are a fourth pixel group, second and third sub-row groups of the second three rows is a fifth pixel group, fifth and sixth sub-row groups of the second three rows are a third group. Thus, fifth and sixth sub-row groups of last three rows are n-th pixel group. The plurality of row can be divided as first three rows, second three rows, . . . n-th three rows. However, the present general inventive concept is not limited thereto. It is possible that the plurality of rows can be divided as first fourth rows, second four rows . . . n-th pixel rows.

Figure 7:
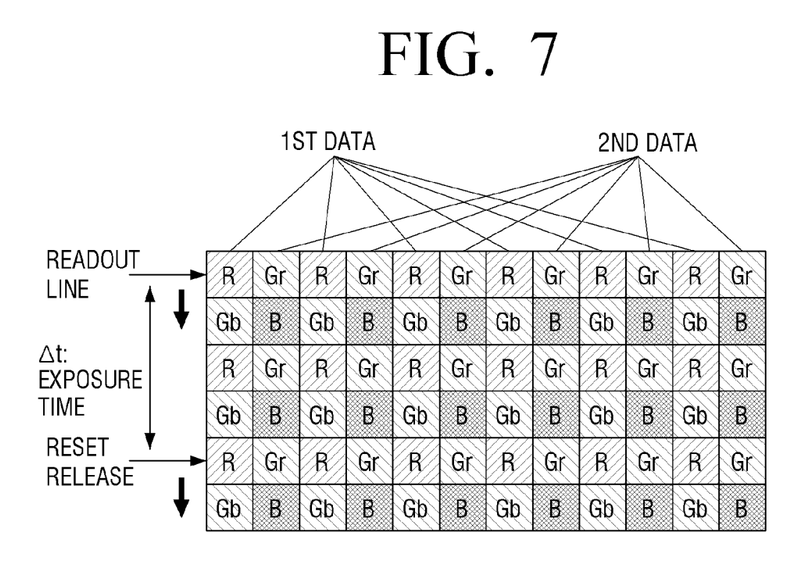
FIG. 7 is a view illustrating an operation of a compression unit of the controller of FIG. 2.

FIG. 7 is a view illustrating an operation of the compression unit 175 of FIG. 2. It is assumed that the image pickup element 152 divides the pixel groups by a matrix row as illustrated in FIG. 4.

Referring to FIG. 7, in one pixel group, sensors to read out two different colors are alternately arranged. That is, since a plurality of color groups exist in one pixel group, the compression unit 154 may compress data for each color group in the pixel group. For instance, the compression unit 154 may generate red pixel values in the first matrix row as a single first compression data, and may generate green pixel values in the first matrix row as second compression data.

Figure 8:
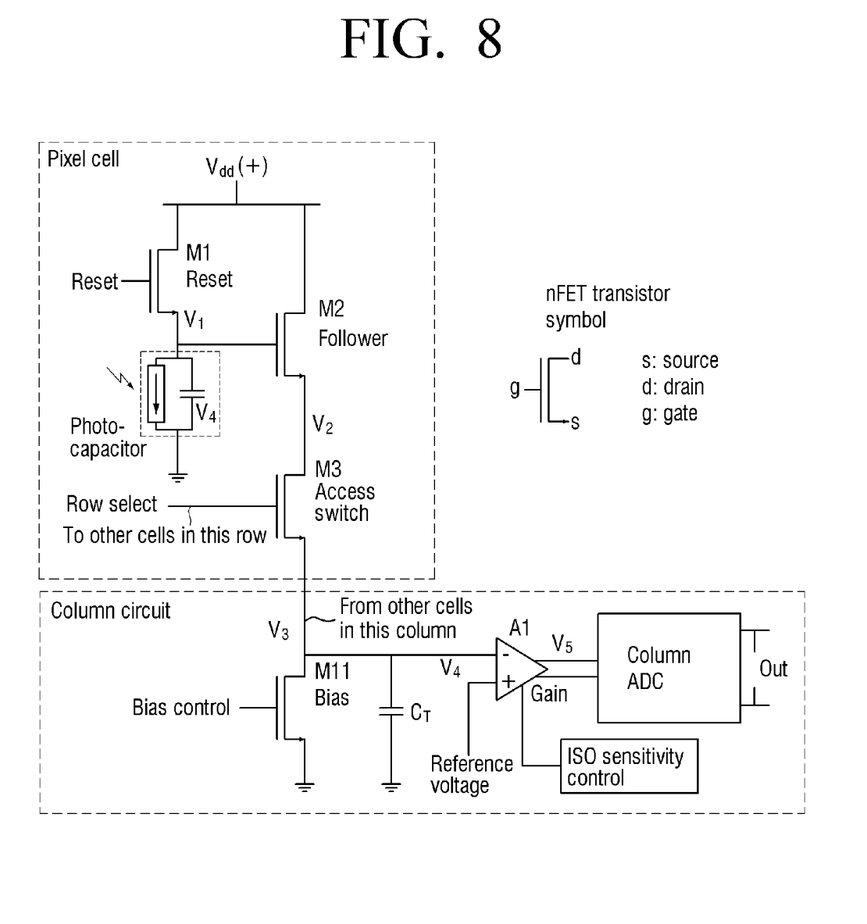
FIG. 8 is a view illustrating a circuit structure of the image pickup element of the image pickup unit of FIG. 2 to perform the image pickup operation of FIG. 3.

FIG. 8 is a view illustrating a circuit structure of the image pickup element 152 of FIG. 2 to perform the image pickup operation of FIG. 3.

Referring to FIG. 8, a CCD pixel cell and an AD converter are illustrated. The CCD pixel cell is a single element in the image pickup element as illustrated in FIG. 3. In the CCD pixel cell, a metal oxide silicon (MOS) FET M1 and a capacitor (photo capacitor) may b2 disposed very close to each other and an electric charge carrier of the MOS is stored in the capacitor by the exposure corresponding to the reset signal. An amount of the electric charge carrier stored in the capacitor changes as a potential V4 with respect to a potential V1 according to an exposure time corresponding to the reset signal.

The stored electric charge carrier V4 stored in the capacitor of the pixel cell is transmitted to a column circuit through a follower M2 and an access switch M3 according to the reset signal and a row select signal. A potential V2 is transmitted from the follower M2 to the access switch M3.

In a column circuit, the amount of the electric charge carrier stored in the capacitor is read out, that is, a voltage value of the capacitor is read out as a potential V3 according to a bias control signal of a MOS FET M11 and a capacitor CT, the read out voltage value is processed in a gain control A1 according to a reference voltage and an ISO sensitivity control signal, and then the gain controlled signal V5 may be output as a digital signal through an analog-digital (AD) converter, such as a column ADC. An AD converter is connected to each of the matrix rows.

When the reset signal is applied to the MOS FET M1, the corresponding sensor is activated and is maintained in an activation operation to sense light until a reset period corresponding to an application time of the reset signal is terminated.

Figure 9:
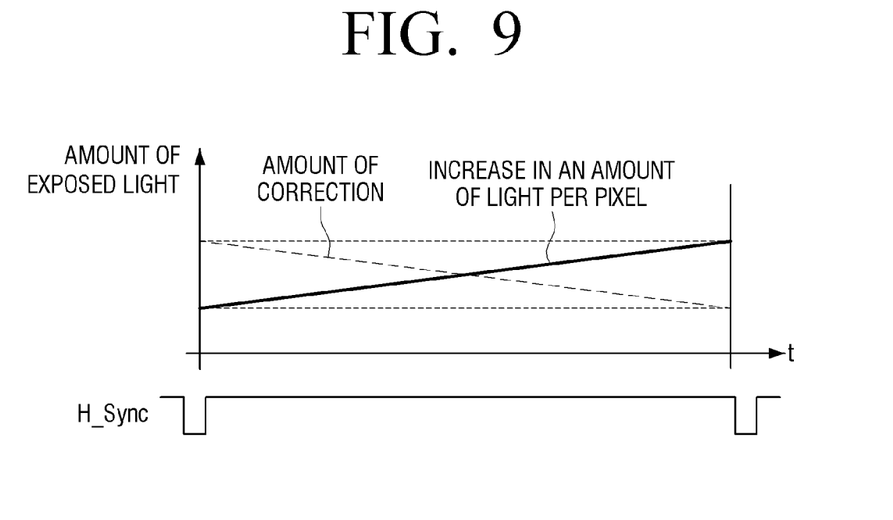
FIGS. 9 and 10 are views illustrating an operation of an image processing unit of the image pickup apparatus of FIG. 1.
Figure 10:
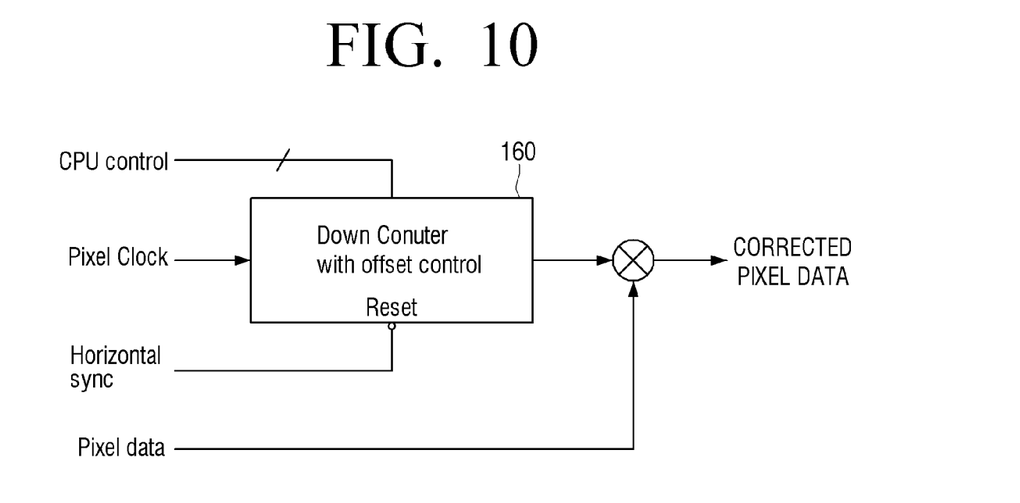

FIGS. 9 and 10 are views illustrating an operation of the image processing unit 160 of the image pickup apparatus 100 of FIG. 1.

If a reset signal is applied on a pixel group basis, the first pixel in the pixel group is exposed to light a first period of time shorter than a period of time of an intermediate pixel and the last pixel is exposed to light a last period of time longer than the period of time of the intermediate pixel according to an image data processing operation.

That is, since the pixels in the pixel group have different exposure times as illustrated in FIG. 9, brightness for each of the plurality of pixels in the pixel group may be corrected. The image processing unit 160 may correct the amount of light to compensate for a difference in brightness for the pixels in the pixel group using a circuit structure illustrated in FIG. 10.

The image processing unit 160 may include a counter (down counter with offset control) to receive a CPU control signal from the controller 170, a pixel clock, and a horizontal sync corresponding to a row of the pixels, to output a signal corresponding to an amount of correction (FIG. 9) to be applied to the pixel data, and to output corrected pixel data.

Figure 11:
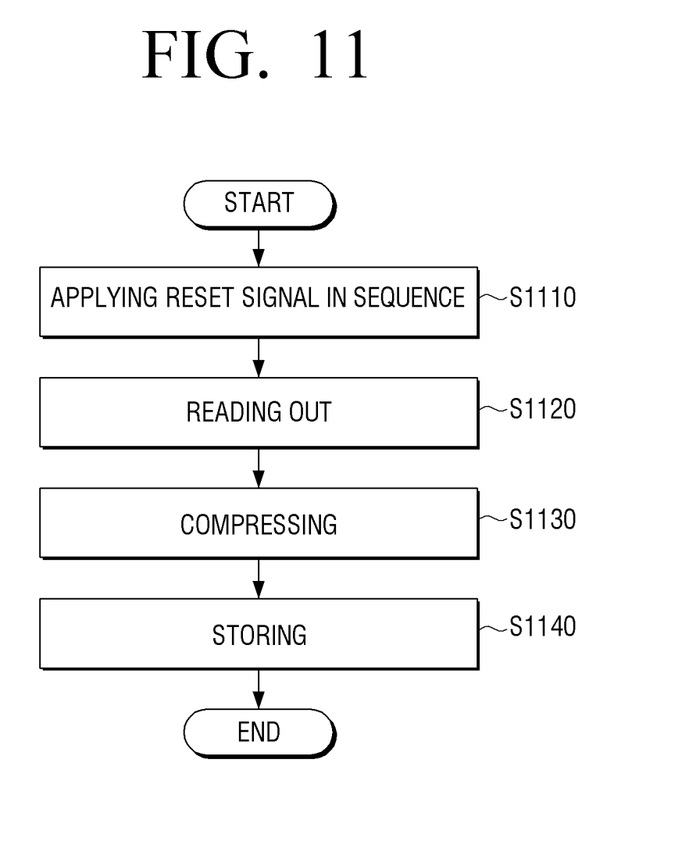
FIG. 11 is a flowchart illustrating an image pickup method according to an exemplary embodiment of the present general inventive concept.

FIG. 11 is a flowchart illustrating an image pickup method according to an exemplary embodiment of the present general inventive concept.

A reset signal to start exposure of a pixel is applied to the image pickup element 152 of the image pickup unit 150', which includes a pixel array of a plurality of pixels which are classified into a plurality of pixel groups and are arranged in a matrix pattern, on a pixel group basis in sequence at operation S1110. At this time, the pixel groups may be divided by a matrix row as illustrated in FIG. 4, may be divided by a plurality of rows as illustrated in FIG. 5, or may be divided by left and right regions of a matrix row of a column as illustrated in FIG. 6, for example.

Pixel values of the plurality of pixel groups are read out on the pixel group basis in sequence so that each of the pixel groups has the same exposure time at operation S1120. Specifically, at a predetermined time after the reset signal is applied, pixel values of the pixels of the pixel group to which the reset signal is applied may be read out.

The read-out pixel values are compressed on the pixel group basis at operation S1130. The pixel values read out on the pixel group basis may be compressed using a near-lossless compression algorithm.

The pixel values compressed on the pixel group basis are stored at operation S1140. The compressed pixel values are restored and a single image is generated by combining the restored pixel values.

The reading-out method described above applies the reset signal on the pixel group basis in sequence as an operation corresponding to an operation of a related-art front curtain, and reads outs the pixels values on the pixel group basis at a predetermined time after the reset signal is applied, as an operation corresponding to an operation of a mechanical rear curtain. Therefore, the image pickup operation can be performed without a mechanical shutter. Also, since the reading-out method according to the exemplary embodiment compresses the pixel values of the picked-up pixels prior to transmitting and processing them, it is possible to process data at a high speed and to reduce heating and power consumption when transmitting the data. Also, a chip area of a system can be reduced. The reading-out method of FIG. 11 may be implemented on the image pickup apparatus of FIG. 1 and may be implemented on other image pickup apparatuses.

The above-described reading-out method may be realized as at least one execution program to execute the image correction method described above, and the execution program may be stored in a computer-readable medium.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

The foregoing exemplary embodiments and advantages are merely exemplary and are not to be construed as limiting the present inventive concept. The exemplary embodiments can be readily applied to other types of apparatuses. Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image pickup apparatus, comprising:
   an image pickup element to obtain an image of a subject using a plurality of pixels which are classified into a plurality of pixel groups and are arranged in a matrix pattern;
   a controller to apply a reset signal to start exposure of a pixel on a pixel group basis in sequence, to read out pixel values of the plurality of pixel groups on the pixel group basis in sequence according to the reset signal applying order, and to control the image pickup element such that each of the pixel groups has a same exposure time;
   a storage unit to store the pixel values read out on the pixel group basis in sequence; and
   an image processing unit to perform exposure compensation to correct an amount of light for each of the plurality of pixel values in a pixel group of the plurality of pixel groups in a situation in which an exposure time for a first pixel of the pixel group is shorter than the exposure time for a second pixel of the pixel group.

2. The image pickup apparatus of claim 1, further comprising:
   a compression unit to compress the read-out pixel values on the pixel group basis,
   wherein the storage unit stores the pixel values which are compressed on the pixel group basis.

3. The image pickup apparatus of claim 2, wherein the compression unit compresses the read-out pixel values using a near-lossless compression algorithm.

4. The image pickup apparatus of claim 2, wherein:
   each of the pixel groups comprises different color groups; and
   the compression unit compresses the read-out pixel values on a color group basis in each of the pixel groups.

5. The image pickup apparatus of claim 2, wherein the image processing unit is configured to restore the compressed pixel values which are stored in the storage unit and generates a single image.

6. The image pickup apparatus of claim 1, wherein the controller controls to perform only a storing operation when the storage unit stores the read-out pixel values.

7. The image pickup apparatus of claim 1, wherein each of the pixel groups is a row of the matrix.

8. The image pickup apparatus of claim 1, wherein each of the pixel groups is a plurality of lines of the matrix.

9. The image pickup apparatus of claim 1, wherein, at a predetermined time after the reset signal is applied, the controller controls to read out pixel values of pixels in a pixel group, of the plurality of pixel groups, to which the reset signal is applied.

10. The image pickup apparatus of claim 1, wherein the situation is in response to the reset signal being applied on the pixel group basis.

11. An image pickup method of an image pickup apparatus, the image pickup method comprising:
applying a reset signal to start exposure of a pixel to an image pickup element, which comprises a plurality of pixels which are classified into a plurality of pixel groups and are arranged in a matrix pattern, on a pixel group basis in sequence;
reading out pixels values of the plurality of pixel groups on the pixel group basis in sequence so that each of the pixel groups has a same exposure time;
storing the pixel values which are read out on the pixel group basis in sequence; and
performing exposure compensation to correct an amount of light for each of the plurality of pixel values in a pixel group of the plurality of pixel groups in a situation in which an exposure time for a first pixel of the pixel group is shorter than the exposure time for a second pixel of the pixel group.

12. The image pickup method of claim 11, further comprising:
compressing the read-out pixel values in the pixel group basis,
wherein the storing comprises storing the pixel values which are compressed on the pixel group basis.

13. The image pickup method of claim 12, wherein the compressing comprises compressing the read-out pixel values using a near-lossless compression algorithm.

14. The image pickup method of claim 12, wherein:
each of the pixel groups comprises different color groups; and
the compressing comprises compressing the read-out pixel values on a color group basis in each of the pixel groups.

15. The image pickup method of claim 12, further comprising:
restoring the compressed pixel values which are stored in the storage unit and generating a single image.

16. The image pickup method of claim 11, wherein the storing comprises performing only an operation of storing only the read-out pixel values when the read-out pixel values are stored.

17. The image pickup method of claim 11, wherein each of the pixel groups is a row of the matrix.

18. The image pickup method of claim 11, wherein each of the pixel groups is a plurality of rows of the matrix.

19. The image pickup method of claim 11, wherein the reading out comprises reading out pixel values of pixels in a pixel group, of the plurality of pixel groups, to which the reset signal is applied at a predetermined time after the reset signal is applied.

20. The image pickup method of claim 11, wherein the situation is the applying the reset signal on the pixel group basis.

21. A non-transitory computer-readable medium to contain computer-readable codes as a program to execute an image pickup method, the image pickup method comprising:
applying a reset signal to start exposure of a pixel to an image pickup element, which comprises a plurality of pixels which are classified into a plurality of pixel groups and are arranged in a matrix pattern, on a pixel group basis in sequence;
reading out pixels values of the plurality of pixel groups on the pixel group basis in sequence so that each of the pixel groups has a same exposure time;
storing the pixel values which are read out on the pixel group basis in sequence; and
performing exposure compensation to correct an amount of light for each of the plurality of pixel values in the pixel group in a situation in which an exposure time for a first pixel of the pixel group is shorter than the exposure time for a second pixel of the pixel group.

* * * * *